(12) United States Patent
Sheinman

(10) Patent No.: US 12,371,923 B2
(45) Date of Patent: Jul. 29, 2025

(54) WIND TOWER PRINTING DEVICE AND METHOD

(71) Applicant: Massivit 3D Printing Technologies Ltd., Lod (IL)

(72) Inventor: Yehoshua Sheinman, Ra'anan (IL)

(73) Assignee: Massivit 3D Printing Technologies Ltd., Lod (IL)

( * ) Notice: Subject to any disclaimer, the term of this patent is extended or adjusted under 35 U.S.C. 154(b) by 224 days.

(21) Appl. No.: 17/901,974

(22) Filed: Sep. 2, 2022

(65) Prior Publication Data

US 2023/0407665 A1    Dec. 21, 2023

Related U.S. Application Data

(60) Provisional application No. 63/352,660, filed on Jun. 16, 2022.

(51) Int. Cl.
| | |
|---|---|
| *B33Y 10/00* | (2015.01) |
| *B33Y 30/00* | (2015.01) |
| *E04G 21/04* | (2006.01) |
| *E04H 12/12* | (2006.01) |
| *E04H 12/34* | (2006.01) |
| *F03D 13/20* | (2016.01) |

(52) U.S. Cl.
CPC ............ *E04H 12/341* (2013.01); *B33Y 10/00* (2014.12); *B33Y 30/00* (2014.12); *E04G 21/04* (2013.01); *E04H 12/12* (2013.01); *F03D 13/20* (2016.05); *F05B 2230/30* (2013.01); *F05B 2280/4007* (2013.01); *F05B 2280/6015* (2013.01)

(58) Field of Classification Search
CPC ......... B33Y 80/00; B33Y 10/00; B33Y 30/00; E04H 12/341; E04H 12/12; E04G 21/04; E04G 21/0463; E04G 21/0427; F03D 13/20; F03D 13/112; F05B 2230/30; F05B 2280/4007; F05B 2280/6015; F05B 2230/31

See application file for complete search history.

(56) References Cited

U.S. PATENT DOCUMENTS

| | | |
|---|---|---|
| 4,976,587 A | 12/1990 | Johnson et al. |
| 5,121,329 A | 6/1992 | Crump |
| 8,807,953 B2 | 8/2014 | Jensen |
| 10,328,635 B1 | 6/2019 | Osiroff et al. |
| 2018/0347541 A1 | 12/2018 | Kudsk |
| 2022/0034108 A1 | 2/2022 | Cooper et al. |
| 2022/0034116 A1 | 2/2022 | Turnquist et al. |
| 2022/0049521 A1 * | 2/2022 | Turnquist .............. E04H 12/341 |

* cited by examiner

*Primary Examiner* — Monica A Huson
(74) *Attorney, Agent, or Firm* — Manelli Selter PLLC; Edward Stemberger

(57) ABSTRACT

A printing system for printing the lower base of a wind tower or the entire wind tower. The system includes a printing device configured to print the coaxial polymeric shells with an empty volume between the shells. The printing device uses the coaxial polymeric shells as driving rails. A concrete material deposition device configured to deposit the concrete material into the empty volume between the polymeric shells, and a rebar handling device is configured to deliver rebars into the volume between the polymeric shells to reinforce the deposited concrete material.

22 Claims, 13 Drawing Sheets

VIEW A-A

WIND TOWER PRINTING DEVICE AND METHOD

TECHNOLOGY FIELD

The present method and apparatus generally relate to manufacturing 3D objects from reinforced concrete, particularly to automated processes and equipment for printing the concrete base of wind turbines or complete wind turbine towers.

BACKGROUND

Height is an essential parameter for wind turbine towers. The taller the towers are, the more energy they can harness. Transporting massive wind tower components to installation sites is logistically challenging and costly. Efforts were made to create a more efficient giant wind towers manufacture. Particularly 3D printing methods were applied to the manufacture of wind towers. The concrete base of the tower manufactured on-site makes wind turbine towers easier and more efficient to build and lowers transportation costs.

The on-site printing effort offers potential for higher wind towers that capture more wind energy in more places. Installing taller wind towers makes economic sense because more wind towers capturing more wind drive down the costs for each installation and lower the overall energy cost in some locations, leading to lower electricity costs for consumers. Printing the towers on site solves the problem of transporting massive wind towers to places that do not have access to railways or roadways that can handle large trucks. Additionally, 3D printing concrete at the installation allows customization of the height of the tower sections for different installations and locations.

The suggested by different authors 3D printing methods and devices have three inherent disadvantageous characteristics:
1. The formulation of the printed concrete is unique for the application. This particularity generates an increase in the concrete cost. Special requirements are not important in the conservative concrete (fast drying time, high flowability through relatively small nozzles, etc.) that are significant for 3D printed concrete.
2. The printed concrete does not contain steel reinforcement. The steel reinforcement's absence might cause dynamic problems (lack of stretching resistance) in highly dynamic applications like wind towers.
3. As in the other 3D printing devices for the construction industry, the concrete dispensing process uses a cartesian 3D gantry or similar. The gantry is giant (10 m planar for printing the tower diameter and at least 30 m height for printing the lower section of the wind tower). Highly skilled technicians install and remove the gantry for each printed wind tower. The gantry should be compatible with the extreme wind conditions typical to a wind site. The gantry should be stable (without vibrations) and sustain wind speeds of more than 15 m/s.

The listed above characteristics of the existing 3D printing wind towers method are challenging to adopt, and thus the use of the on-site printing methods is not spread.

This present disclosure supports a change of the said characteristics. The concrete in use can be standard, well documented, and relatively low-cost concrete. The printing methods contain a steel reinforcement step; thus, the concrete is steel reinforced. The building method does not require gantry. The suggested method uses the printed wind tower part as a rail for the next printing steps. The wind tower is "building itself" without the need to install a parallel giant gantry.

The applicant believes that U.S. Pat. No. 10,328,635 B1 to the same assignee could be considered a reference for the present application.

Definitions

A rebar (short for reinforcing bar) is a steel bar or mesh of steel wires used as a tension device in reinforced concrete to strengthen and aid the concrete under tension. Concrete is strong under compression, but has weak tensile strength.

Rebar sizes are regulated by different National Standards. In the United States they are outlined by ASTM A955/A955M Standard Specification for Deformed and Plain Stainless-Steel Bars for Concrete Reinforcement. In Europe by EN10080 2005, In Germany by DIN488-1 1984, DIN 466-2-2009, and DIN 448.6 2010.

As used in the current description, the term a monolithic ring cross-section means a smooth surface.

As used in the current description, the term a structured ring cross-sections mean a surface with protrusions and deeps.

As used in the current description, the term conservative concrete means concrete currently used in the construction industry.

A cartesian gantry is a gantry that supports a tool, a nozzle in the present case, movement across a horizontal plane.

As used in the current description, the term "orbiting carriage or "orbiting system" has the same meaning and relates to a carriage with a printing system circling around an axis of symmetry of the wind tower base.

SUMMARY

The wind tower structure is tubular with a slight upwards cone inclination or a sharp top cone angle. The tower could be made from steel in segments. Due to transportation problems, the bottom segments of the wind tower (that need to have a large diameter (greater than 5 m)) cannot be transported easily because of the existing bridges height and lane width.

An optional solution for transporting such large items is making the bottom segment on-site, using conventional reinforced steel concrete. As the height of this first segment (base) can reach 100 m, and due to the conical shape, building the wind tower (in the traditional way) by concrete casting using steel shells is complex. It requires a large skilled crew to assemble the shells and disassemble them or trade by lengthy building period.

Another optimal solution is to print the entire wind tower (full height). The attempt to 3D print these segments indicated the concerns described above for the wind tower base printing and clearly for the entire wind tower height printing.

The following US patents and applications U.S. Pat. Nos. 4,976,587; 8,807,953; US 20180347541, US 20220034108, and US 20220034116 disclose different aspects of wind tower printing.

Casting of an object using 3-D printed shells and then casting in lag is described in U.S. Pat. No. 10,328,635 B1 to the same assignee. The '635 patent discloses three steps for printing such shells:
1. Employing a first polymeric material to deposit the first and second pattern layers, laterally shifted from each other. The space between the laterally shifted pattern layers generates the casting cavity.

2. Casting into the empty volume of the casting cavity material generates the required casted object.
3. After solidifying the casted material, the shells could be removed to expose the casted object.

While the adaptation of this method to wind tower segment printing—the following variations were applied:

1. The casting cavity shells have to sustain large stresses as the volume of the concrete could be large, and the hydrostatic pressure could also be large. The requirement increases the thickness of the printed polymeric shell.
2. The patent describes shells made from UV curable photopolymer that allows rapid solidification. The rapid solidification allows the printing of complex geometries, including overhung and non-supported material layers. The rapid solidification requirement of the casted material, and the use of a specific casted material, are unnecessary in the wind tower case. A wind tower's planar cross sections (perpendicular to the vertical axis) are always made from two concentric circles. This geometry does not include overhanging or request for support; thus, the wind tower shells could be made from less expensive and sophisticated materials.
3. As a result of par. 1 and 2: The shells could be made from low-cost recyclable, sustainable material; the high shell thickness could be of larger width, and the shell cost could be reduced. The simple printed polymeric shell geometry supports simple layer attachment. The polymeric shells could be made from thermoplastic material. The thermoplastic material can be made using ready-made filament and attaching the filament to the previous layer using FDM (fused deposition modeling, like U.S. Pat. No. 5,121,329, and others) or by dispensing molten thermoplastic materials.
4. A cartesian gantry carries the nozzles dispensing the different materials in the existing references. In the wind tower case, the external construction of a giant gantry generates its own complexities. From the dispenser side use of an external cartesian gantry system to build complex geometries seems reasonable there. Unfortunately, from the project operation side—a giant tall gantry at windy site seems like a bad choice.
5. Unlike the said references—the printed polymeric shells are not disassembled after the casting process but remain part of the tower skin. This promotes a rough shell surface and high concrete wettability.
6. In the references mentioned above, the casting cavity is solely filled with the casting material. In the case of a wind tower, the concrete could be reinforced by embedded steel rebar. The rebars could be tied and connected. The rebar construction could be installed after the shell printing, and before the concrete casting, in a similar manner as in the conservative concrete building process.

In the suggested disclosure, the printed polymeric shells that are used for the concrete casting and that have a circular cross-section used as transport rails. The center of the tower base circle is marked using a central steel plug. The plug has two uses:

1. In the beginning of the wind tower building process—the polymeric shells are printed on the foundation base plate. A central steel plug could be used to ensure the accuracy of the printed circle (generated by an orbiting printing system). The central plug is used as the fixed point of a pair of compasses (rotating arms), while the rotational point is the polymeric shell printing orbiting carriage. A steel bar can provide the connection between the plug and the orbiting carriage.
2. When the rails (the end faces of the polymeric shells) are already printed, the orbiting printing system could measure (for control purposes) both the center and the elevation above the foundation base plate (to ensure that the cone angle of the tower is maintained). The plug could be equipped with an optical target. The orbiting printing system could be equipped with an optical distance meter. The measured distance from the plug to the orbiting system provides both centricity and elevation control.

The polymeric shells should resist the hydrostatic pressure of the casted concrete. The pressure is proportional to the casted concrete volume, which is proportional to the distance between the shells ("wall thickness") and the height of the shells above the previously casted surface. As the wall thickness is part of the wind tower design, the height of the shell becomes a printing parameter. Low height above the previous casting increases the dependency on the concrete solidification rate, as even semi solidified concrete layer dramatically reduces the hydrostatic pressure on the shells. High height above the previous casting requires strong polymeric shells. These strong shells mean high investment in printing time and material cost.

Another option to reduce the hydrostatic pressure is to design the wind tower with two concentric concrete rings with the addition of a plural number of connection bars between them. This design replaces a single thick concrete ring design. The higher shell surface area requires more polymeric shell printing time but less polymeric shell material.

The polymeric shell printing is performed while orbiting around the wind tower base center. The polymeric shell basic layer is printed while circling clockwise for about a full turn (360°), and then the next layer is printed while circling back (anti-clockwise). This option can be faster but is more complex and expensive. The orbiting system uses the end face of the shells as rails, and in particular the inner shell, so the orbiting system could ride on the previously printed layer while printing the current layer. Printing back and forth movement requires shifting the printing system from one trailing edge (while driving clockwise) to the other side, the new trailing edge (while driving anti-clockwise).

Another possible option is to print the layer in the same direction (clockwise, for instance) while the return circle (anti-clockwise) is an idle step. In this option—the arrangement of the printing elements is less complex with the penalty of a longer printing period.

The printing system does not perform more than a single turn in both options. This eases the concrete delivering hose connection and winch connection to the stationary support systems at the foundation base plate level.

After printing the shells at the pre-determined height, which could be 5 to 15 mm, the rebar construction could be installed.

The rebar installation contains the following steps:

1. Using a controlled winch, the rebar section is lifted to the orbiting carriage, regardless of its height above the foundation base plate. The rebar can be loaded manually or using a stack of rebars and a singulation unit in the ground-level stationary support system.
2. A robotic arm (mounted on the orbiting system) inserts the lifted rebar into the system holding platform as a "ready to use" stack. The robotic arm includes a press gripper; the gripper inserts the standard rebar module to the previously delivered standard rebar module using a pressure seat by the sleeves.

3. The same robotic arm picks a rebar module from the platform and connects it to the previous one. The connection procedure is held by insertion the new rebar edges to the edges of the previous rebar (in a lower layer) and by tying the new rebar to the adjacent rebar of the same layer level. The insertion, connection, and rebars connecting procedure generate a tall, combined rebar structure equivalent to the manually made reinforcement and completes the reinforcement process.

After completing the current layer rebar construction, the concrete is pumped upwards to the orbiting carriage and cast. The casting procedure is performed by pouring thin layers of concrete, one on top of the other, to ensure good filling of the casting cavity. The casting procedure supports a combined radial motion of the casting nozzle with a circling motion of the orbiting system. The casting height is slightly less than the rebar height. The concrete casting height leaves the rebar's edges free to prepare for the next layer.

The top cast layer supports the installation of a metal base plate and anchor bolts for the connection of the first metal segment. The current disclosure does not include such a procedure. The connection of the rebars themselves to the metal foundation plate (by welding or other methods) still requires manual labor; thus, the preparation will probably be manual too.

BRIEF DESCRIPTION OF THE DRAWINGS

To understand the apparatus and method and to see how they could be carried out in practice, examples will now be described, by way of non-limiting example only, with reference to the accompanying drawings in which identical referral numbers mean identical or similar parts.

DETAILED DESCRIPTION OF EXAMPLE EMBODIMENTS

The present document discloses an automated method and apparatus for manufacturing wind tower bases. The automated manufacturing method applies to wind tower bases and other 3D objects that are manufactured by preparing a casting form and casting into the form a build material. The suggested method supports on-site manufacture of wind tower bases, reducing the manufacturing cost and providing a better degree of manufacturing flexibility.

Figure 1:
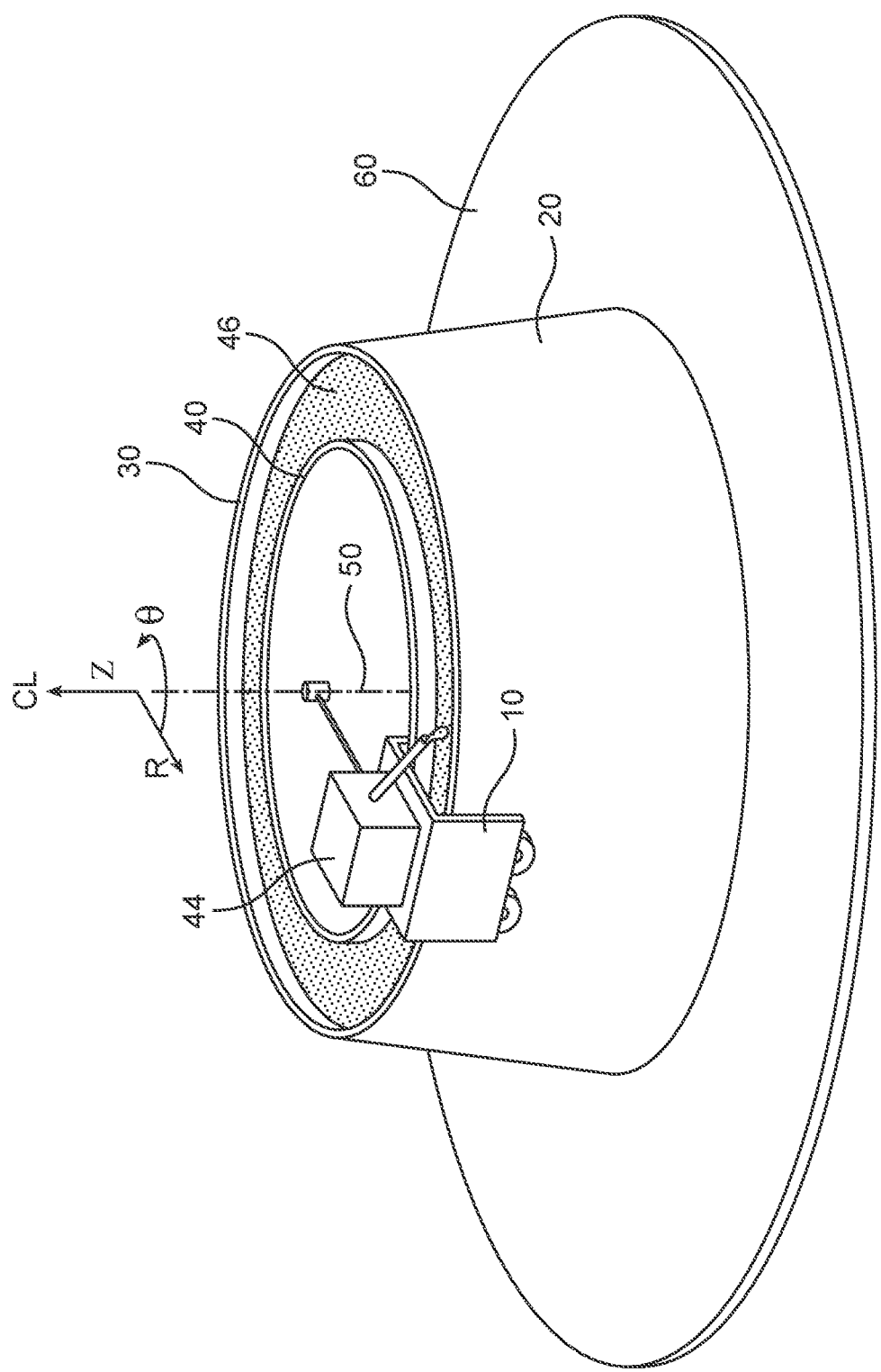
FIG. 1 is an example of an overall view of the orbiting printing system.

FIG. 1 is an example of an overall view of the printing system, including an orbiting carriage. An orbiting carriage (10) is circling around the current tops of the wind tower base (20). Orbiting carriage (10) travel could be analyzed in the cylindrical axes system R$\theta$Z. The orbiting radius R at every height Z depends on the wind tower base design. Orbiting carriage (10) includes polymeric extrusion or dispensing devices that print the outer shell (30) and the inner shell (40) of the wind tower base (20) according to the design. At the same time, the center line (50) remains the reference point. The orbiting carriage printing device prints the first (outer) (30) and second (40) (inner) polymeric shells. The polymeric shells (30 and 40) are coaxial with an empty volume between them. Referral numeral (60) marks a foundation base plate on which the wind tower base (20) is built.

Usually, the wind tower bases are made from concrete material. A concrete material deposition device (44) deposits the concrete material (46) into the empty volume between the first (30) and second (40) polymeric shells. The printing system does not perform more than a single turn in both options. This eases up the concrete material delivering hose connection and winch connection (FIG. 9) to the stationary support systems at the foundation base plate (60) level.

The printing system does not perform more than a single turn. This eases up the concrete delivering hose connection and winch (FIG. 9) connection to the stationary support systems at the foundation base plate (60) level.

Figure 8:
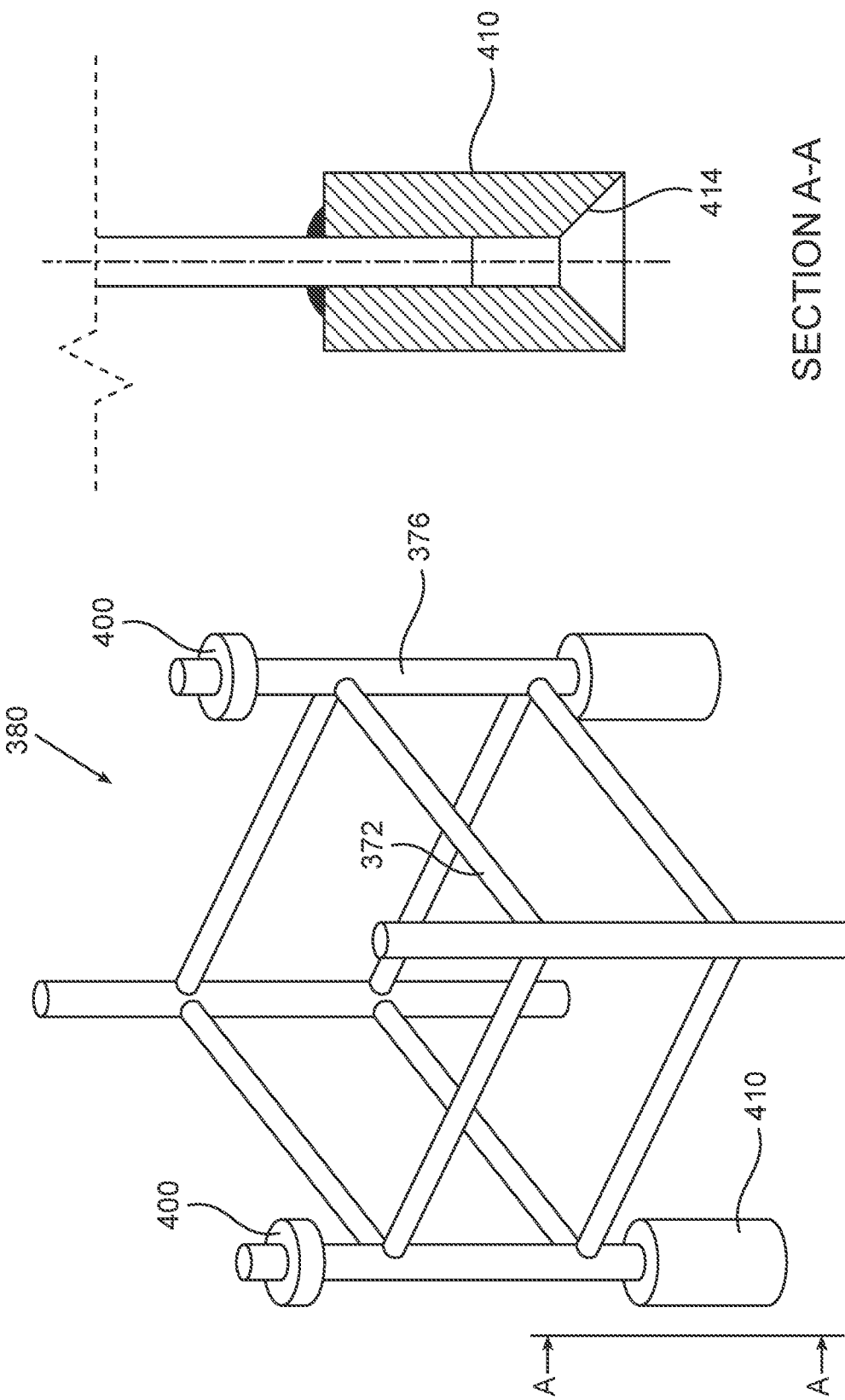
FIGS. 8A and 8B are examples of typical construction rebar.

Insertion of metal rebars in the concrete improves the bending properties of the concrete. A rebar handling device (FIGS. 8 and 10) is configured to deliver rebars into the volume between the first (30) and second (40) polymeric shells to reinforce the deposited concrete material. The rebar handling device includes a rebar connection and tying device, allowing to connect of the different rebar elements into a unified construction.

For each printed layer at any height Z, the orbiting angle $\theta$ is 0<$\theta$<360° (full circle maximum). The temporary height Z (temporary wind tower base height) is measured from the foundation base plate (60).

Figure 2A:
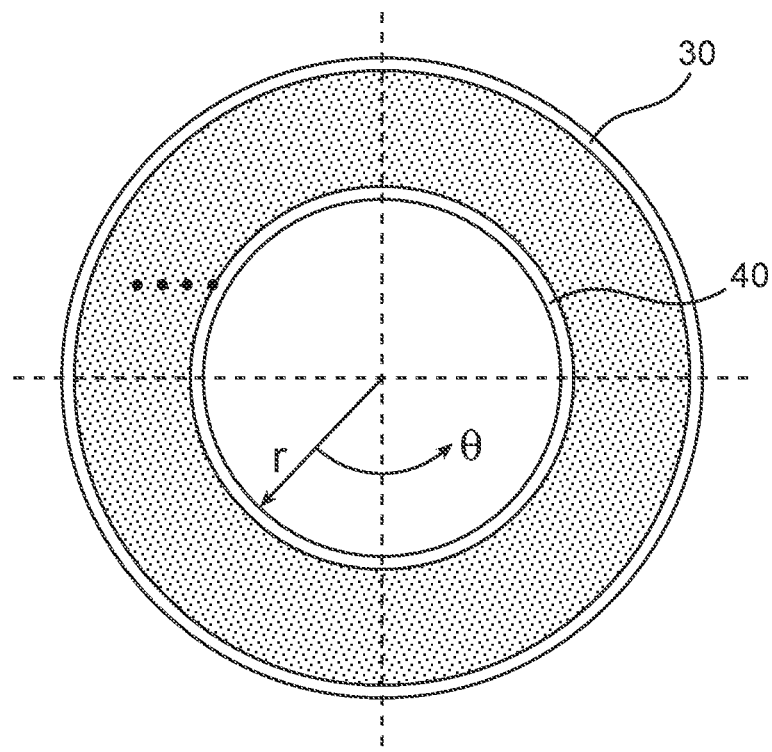
FIGS. 2A and 2B are examples of a cross-section of the wind tower base.

The wind tower base design can vary due to many aspects. The design cross-section can contain a monolithic ring or structured concrete material ring. FIG. 2A is an example of a cross-section of a monolithic ring (32) design of the wind tower base.

Figure 2B:
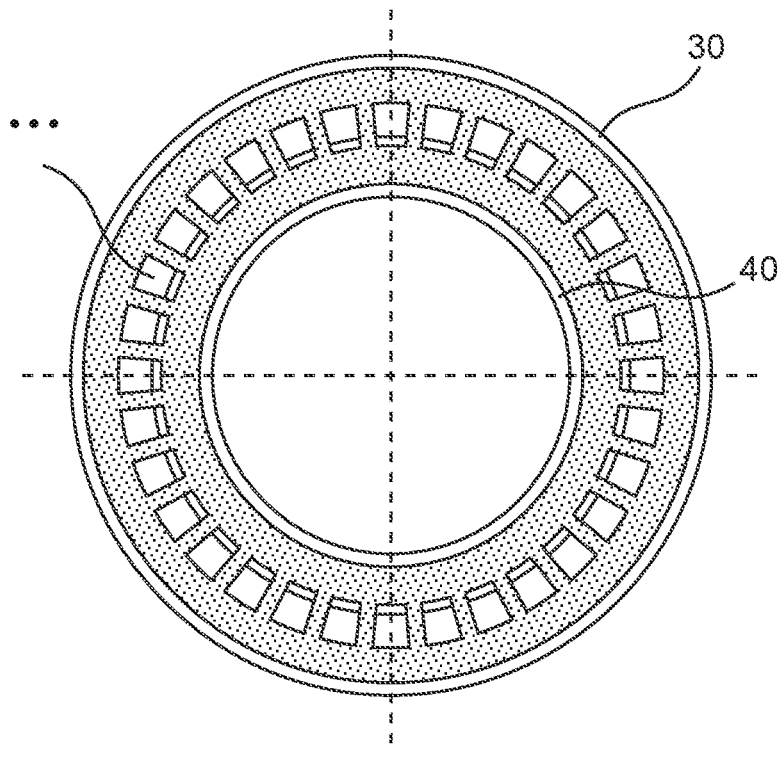

FIG. 2B presents an example of a cross-section of a structured concrete material (34) ring design of the wind tower base. In both cases, the inner printed shell (40) used as rails for the orbiting carriage (10) printing device.

The shell structure can be simple, for example, two concentric rings in the monolithic cross-section case, or can be complex—in the structured cross-section case. Referral number (36) marks empty spaces that continue along the height of the wind tower base. The same printing system could print both designs. As explained above, the printing process prints the "next layer" and the orbiting carriage (10) is riding on the "current layer". This means the printing system should be mounted at the back side of the orbiting carriage ("trailing edge"). The orbiting carriage (10) is large and heavy and driven on low friction material (the shell polymeric material). In an additional example, the printing system could be mounted on a local cartesian gantry added to the orbiting system and not directly on the orbiting carriage. The shell printing procedure is as follows:
1) the orbiting carriage (10) is advancing in a discrete arc ("sector") advance mode;
2) the printing system of the orbiting carriage prints the required layer design using cartesian gantry (as in most 3D printers) till completion of the sector;
3) The orbiting carriage (10) is shifting to the next sector, where there is a handshake between the currently printed layer and the "next layer" all around. At this stage—the "next layer" becomes the "current layer".

Figure 3A:
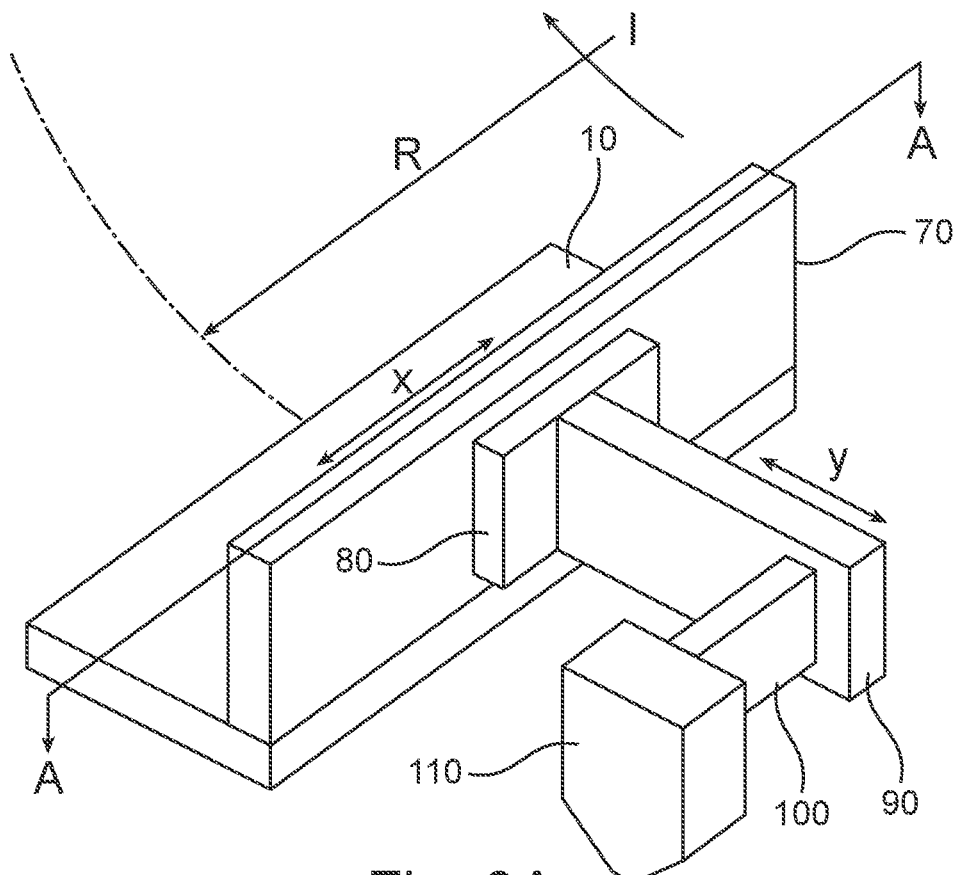
FIGS. 3A and 3B are examples of the typical shell printing unit of the orbiting printing system.
Figure 3B:
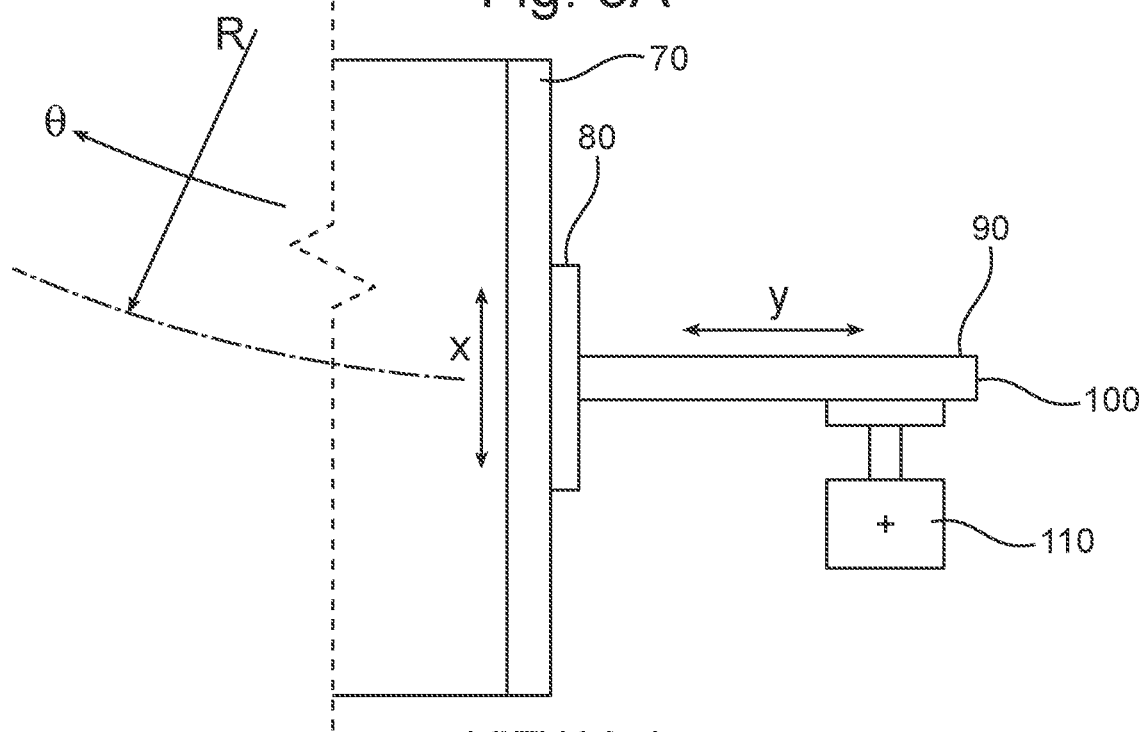

FIGS. 3A and 3B present the shell printing system. The orbiting system (10) circles in the relevant R, in the θ direction. At the rear of the orbiting system, a cartesian gantry is assembled. Motorized linear stage (70) serves as a guide on which the carriage (80) travels in x-direction. Linear stage (90), which is assembled on carriage (80) serves as a guide on which the carriage (100) moves in Y-axis direction. The polymeric material dispenser (110) is assembled on carriage (100), allowing shell printing as described above.

Figure 4:
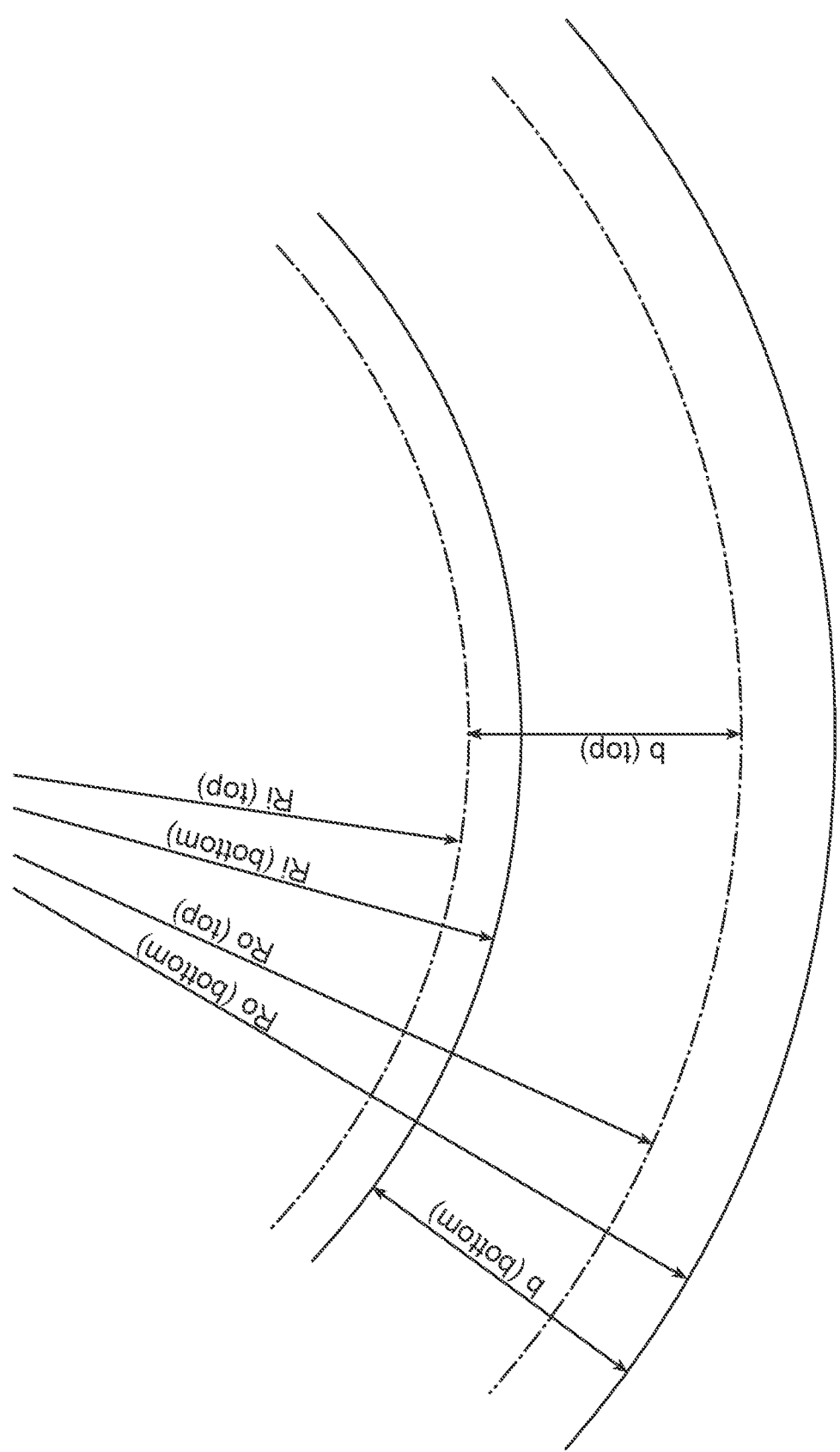
FIG. 4 presents the shell end face position as rails for the orbiting printing systems.

The wind tower base that should be printed is having a cone shape, as the bending moment of inertia should be larger while closer to the tower base. Due to the said cone shape of the tower, the polymeric shells (30 and 40) used as rails and have a different geometry per different layer heights (Z). FIG. 4 presents this variation in the rail location—variation that the wheel system must adopt itself to. A driving mechanism that uses the polymeric shells as rails for carrying the printing system weight does not transfer the weight to the just poured concrete. Ro indicated the outer ring. $R_f$ indicates the inner ring. Bottom/top indicates the level in Z (height) direction.

Figure 5:
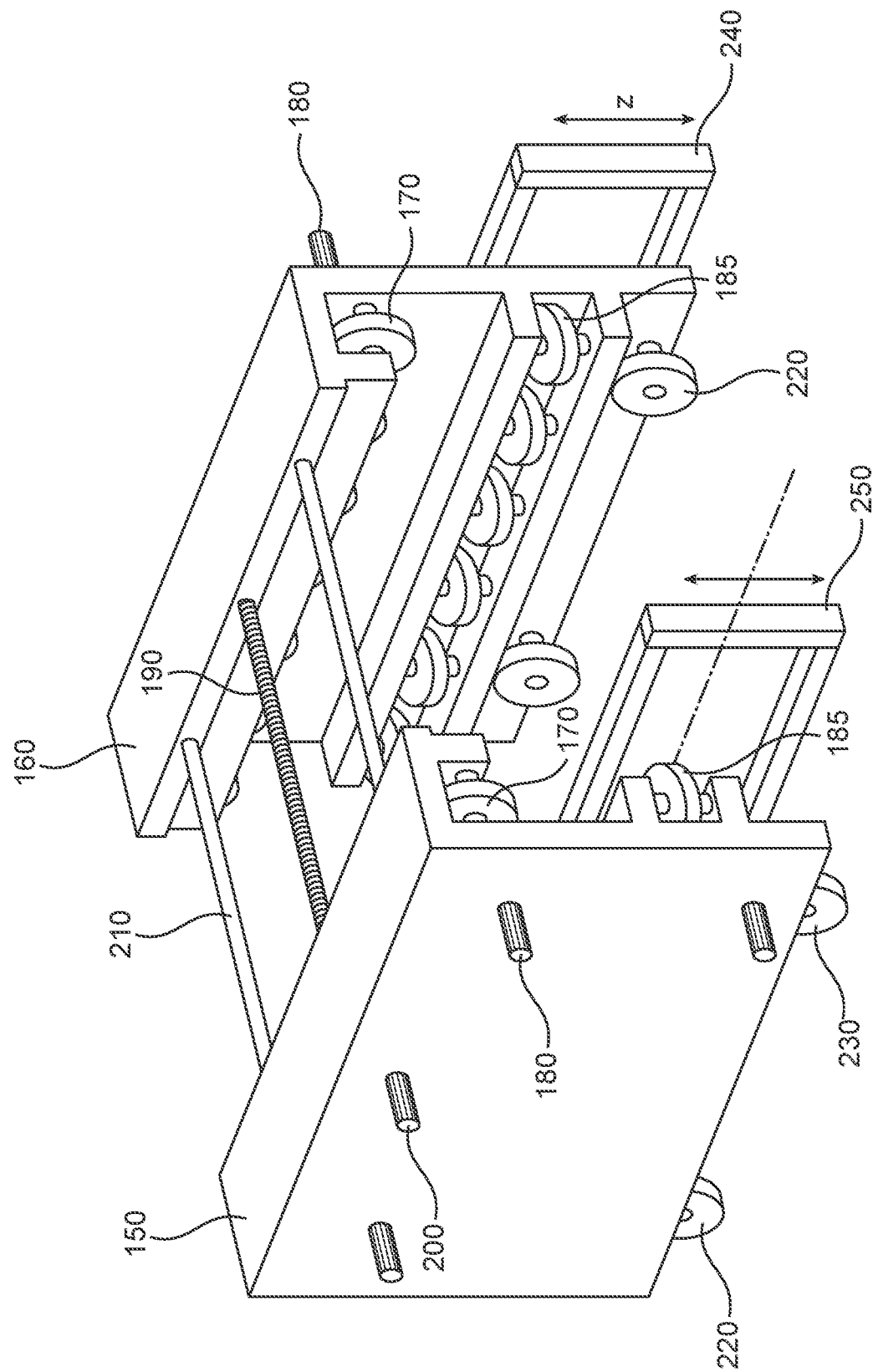
FIG. 5 is an example of the wheels system of the shell printing unit of the orbiting printing system.

The wheel system of the orbiting system is presented in FIG. 5. The wheel system is constructed on two plates—the outer plate (150) and the inner plate (160). These plates are carried on the rails (on an end face of the polymeric shells) using two lines of motorized high friction wheels (170). The driving motors (180) are located on the outer sides of plates (150 and 160). A drive screw (190) operated by a motor (200) ensures that the line of the side wheels (185) from both sides are attached to the wind tower side surfaces. Plates (150) and (160) are kept aligned to each other using two guiding rails (210). When the printing process starts, and the shells are supposed to be printed on the base plate surface, the friction wheels (170) are higher than the surface and cannot function. Four ground-level wheels (220) driven by motors (180) from both sides, are handling the ground level motion. (Initially, the ground-level wheels move over foundation plate (60) (FIG. 1). While using the friction rollers, the shell printing level has a constant distance in Z axis to these wheels, which is the printed shell layer thickness. On the other hand, while using the ground-level wheels (220), the wheels stay at ground level, and the printing level raises in Z-axis direction for each new layer. In this case, the printing level distance of the shells from the ground level wheels (220) is not constant. The distance of the shells from the wheels continues to vary till the friction wheels will touch the shells and will lift the orbiting system (causing the ground wheels to be airborne) to the "regular" riding on the shell end faces scenario. Because of this, the printing system (presented in FIG. 5) could be mounted on motorized Z stages that compensate for this initial variation. The outer plate (150) supports one stage (250), and the inner plate (160) supports the other Z stage (240).

Figure 6:
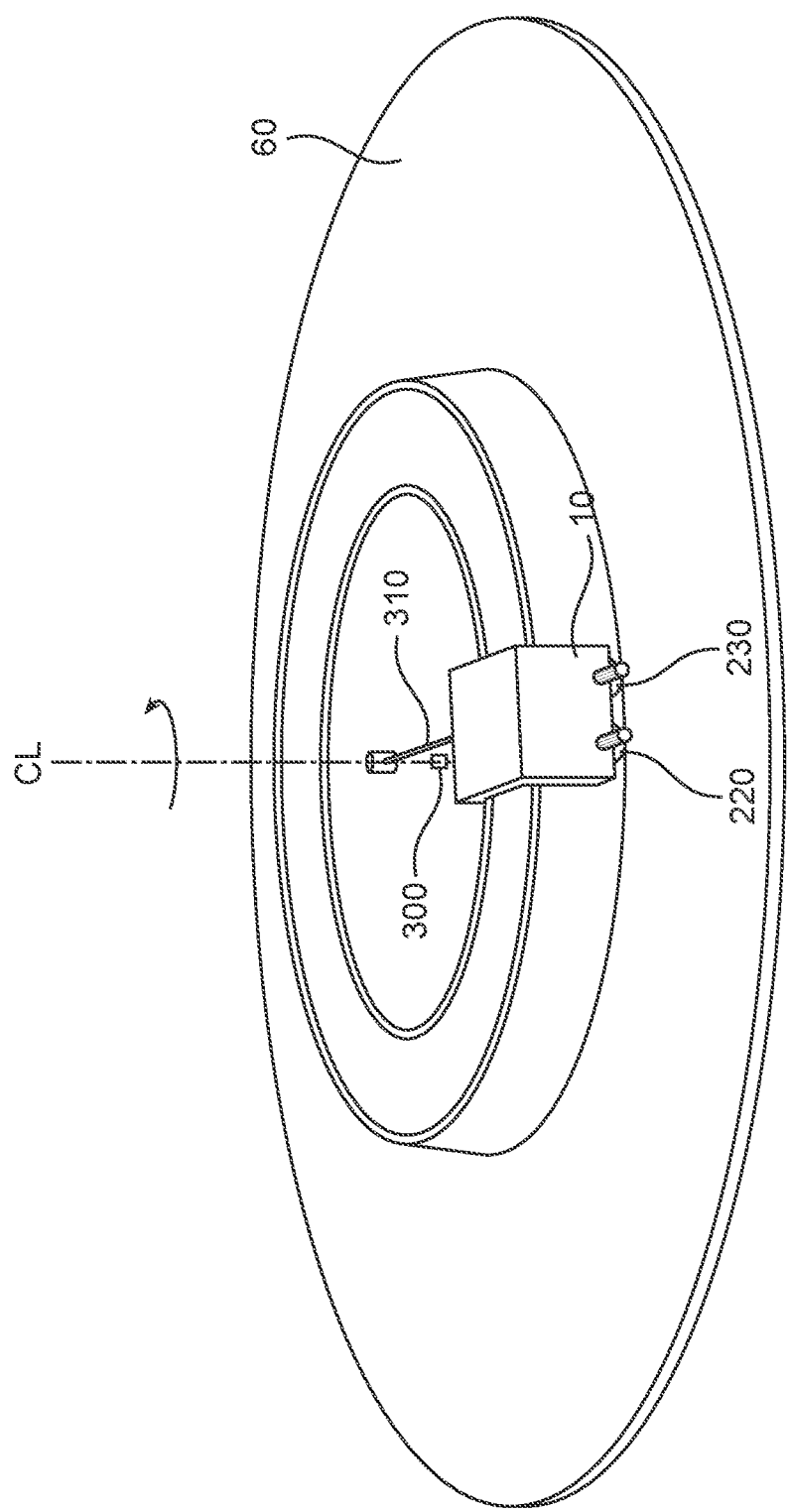
FIG. 6 is an example of the central plug and a pair of compasses that is in use in the foundation base plate height for the shell printing initiation.

While printing on ground level, the shells (serving as rails) are not existing or are not functional yet. FIG. 6, which is an example of the central plug and a pair of compasses that are in use in the foundation base plate height for the shell printing initiation. A central plug 300 installed on the foundation plate (60) in the wind tower center assists in maintaining the circular shape. A rotating arm acts as a compass arm (310) and connects the orbiting system (10) to the plug (300), ensuring an accurate circle when the system is transported by the ground wheels (220) and their motors (180) (FIG. 5).

Figure 7:
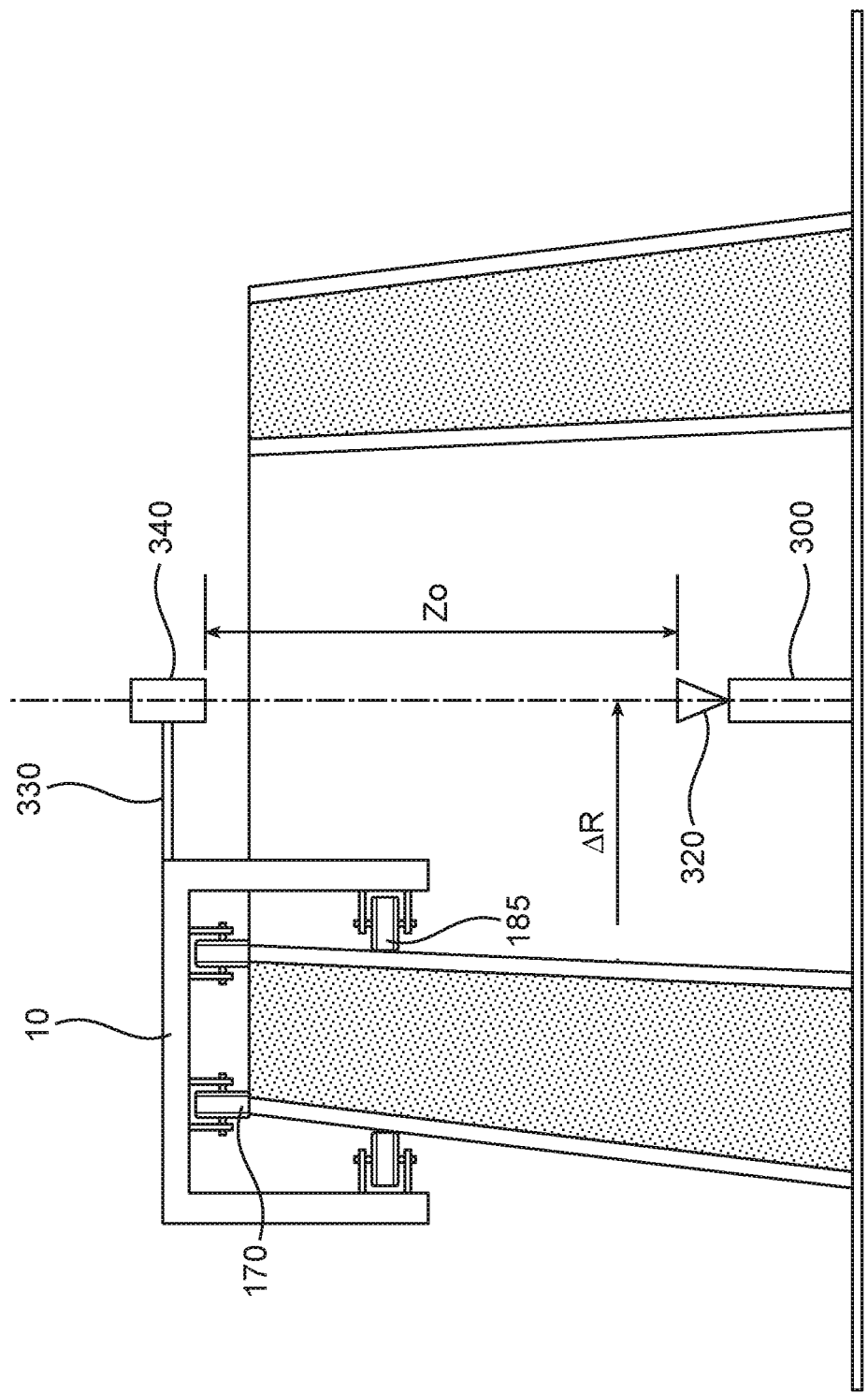
FIG. 7 is an illustration of the radial and height optical location sensing of the orbiting printing system versus the tower center.

Concurrently with the orbiting system (10) movement on the shell "rails", it is possible to measure the height from the foundation plate (Z0) and the radial deviation (ΔR). FIG. 7 is an illustration of the radial and height optical location sensing of the orbiting system versus the tower center. An optical target (320) is assembled on the central plug (300) a fixed arm (330) is installed on the orbiting carriage (10). When the orbiting system is moved to the next sector, Z0 and ΔR are measured. These values are used as the initial setting of the X, Y, Z gantry system for every sector that the dispenser prints.

Standard constructing rebars are the basic reinforcement of the wind tower base concrete. The depth of the casting cavity (generated by the polymeric shells) is limited, and thus the length of rebar construction is limited. The rebar should be firmly connected to its neighbors (bottom and side-wise). The bottom connection is via special sleeves 410. The side connection is via automatic tying. Sleeves 410 include a conical guide 414 that guides the rebar to a proper coupling with the earlier inserted rebar. The standard or typical construction rebar module (380) is presented in FIGS. 8A and 8B. The standard or typical construction rebar is a rectangular rebar construction made of four steel bars (376) and welded connection rods (372). Two pressing disks (400) are connected on one edge of two opposite side steel bars 376. Connection sleeves (410) are welded at the other side of these bars.

Figure 9:
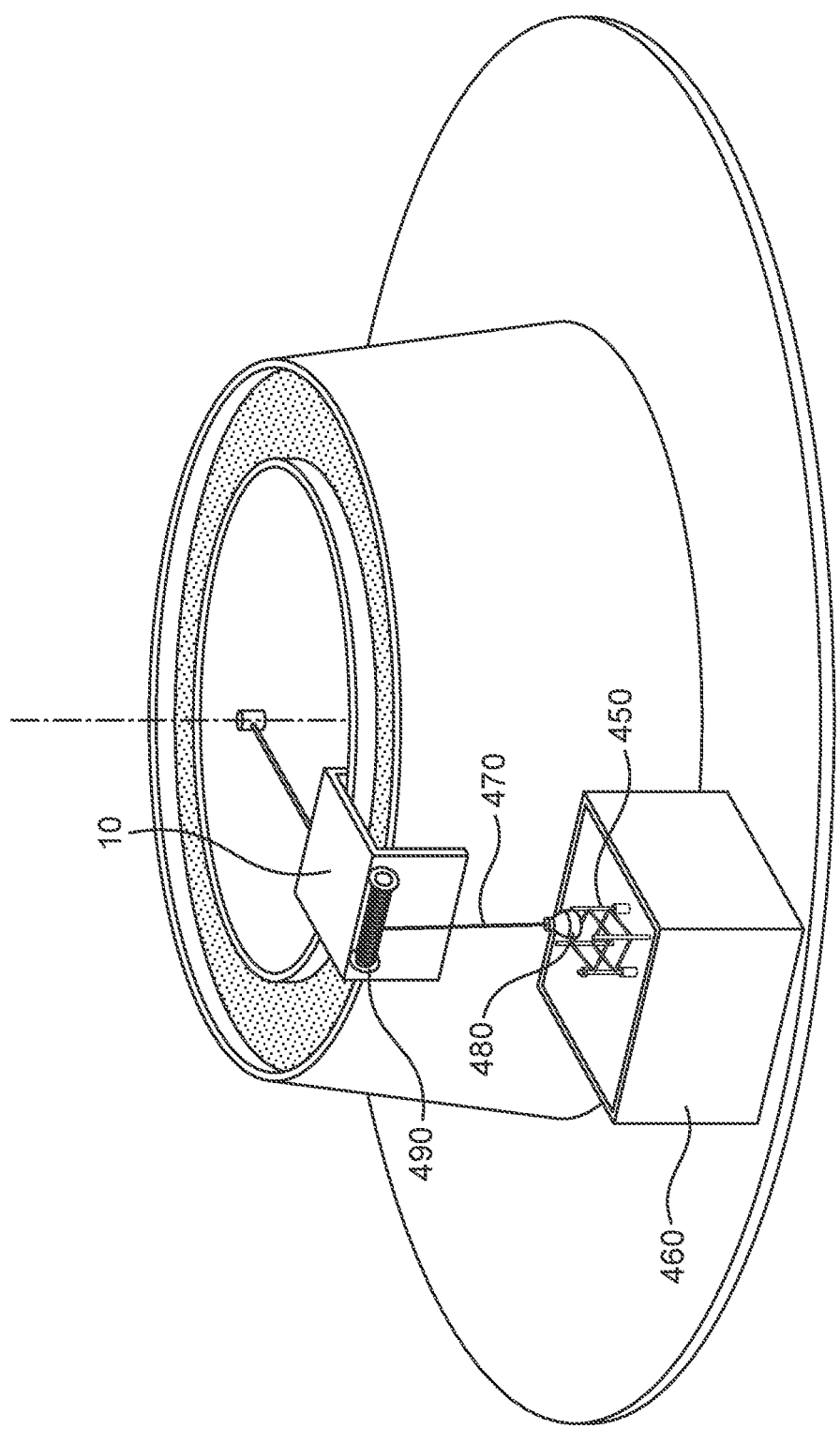
FIG. 9 is an example of the winch that transports the rebar module to the orbiting printing system.

FIG. 9 is an example of a winch that transports the rebar module to the orbiting system. The standard rebar modules (380) could be hocked by a hook or an electromagnet (480) that is connected to a lifting rope (470). The electromagnet (480) picks the standard rebar module from the stationary rebar module containers (460) and lifts it using a winch (490) to the orbiting system (10). The standard rebar modules consume a large volume and have a large weight. Thus, it is impractical to store on the orbiting system quantity of rebar modules that is sufficient for a full circle of the system. Several stationary rebar containers (460) could be arranged around the wind tower base to facilitate correct rebar modules loading.

Figure 10:
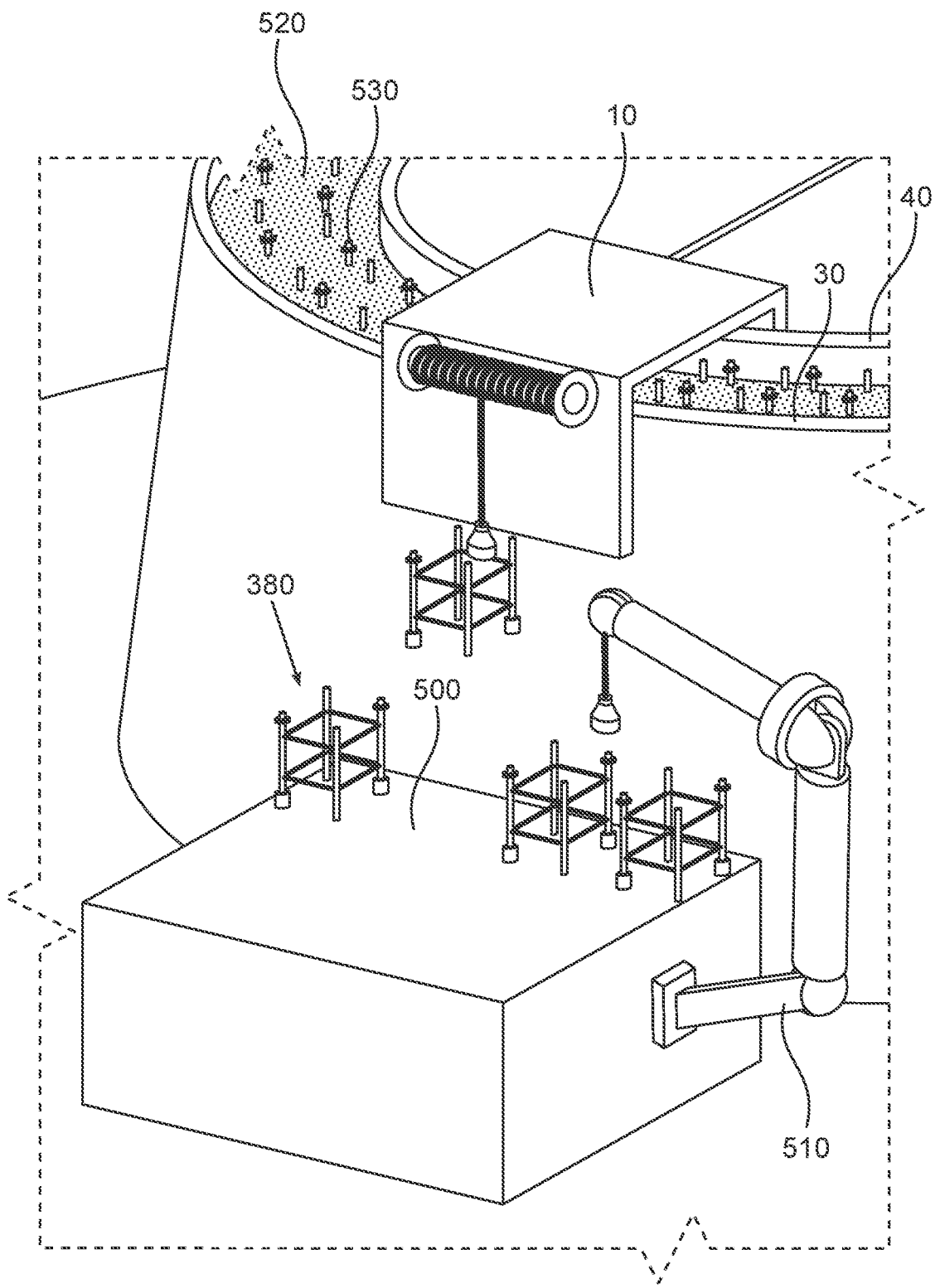
FIG. 10 is an illustration of the robotic arm that installs the rebar.

When the standard rebar modules (380) stay on the orbiting system, a robotic arm picks the standard rebar module (380) and places it on the standard rebar module from the previous layer. Then, a gripper presses the rebars to ensure a stiff connection. Finally, the new rebar is tied to the adjacent rebar of the same level. FIG. 10 presents the robotic arm that installs a standard rebar module. The orbiting system (10) holds a stuck of standard rebar modules (380) on an open platform. A robotic arm (510) lifts the rebar module from its stuck past the outer shell (30) and releases it on the previously assembled module (530) that is already covered by the casted concrete layer (520).

Figure 11:
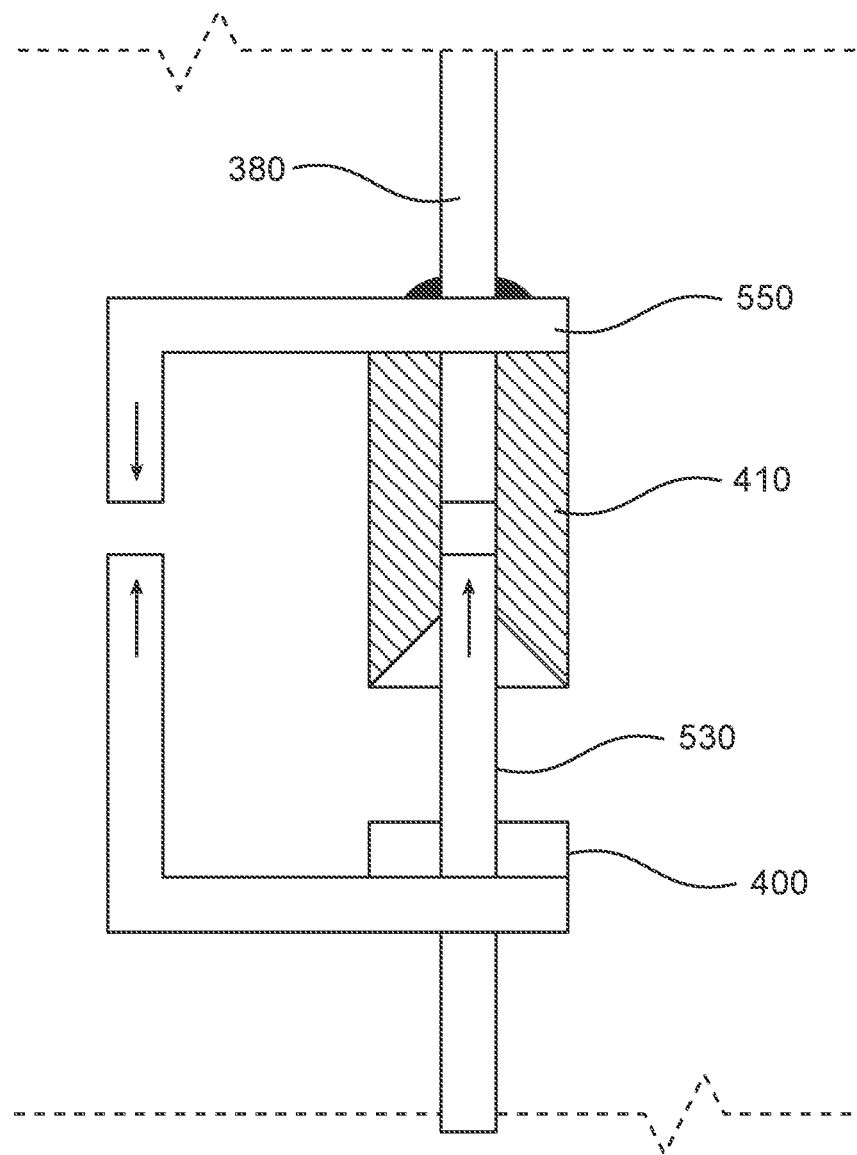
FIG. 11 illustrates the installation of the rebar on the rebar of the previous layer.

FIG. 11 illustrates the installation of the standard rebar module on the standards rebar module of the previous layer.

In order to install the standard rebar module (380), the robotic arm (510) includes a gripper (550) that attaches the previous standard rebar module (530) to the currently assembled standard rebar module (450). The attachment process generates a pressure seat of the last standard rebar module (530) in the sleeves (410) of the new standard rebar module (380). The pressing disk (400) provides a contra-reaction.

Figure 12:
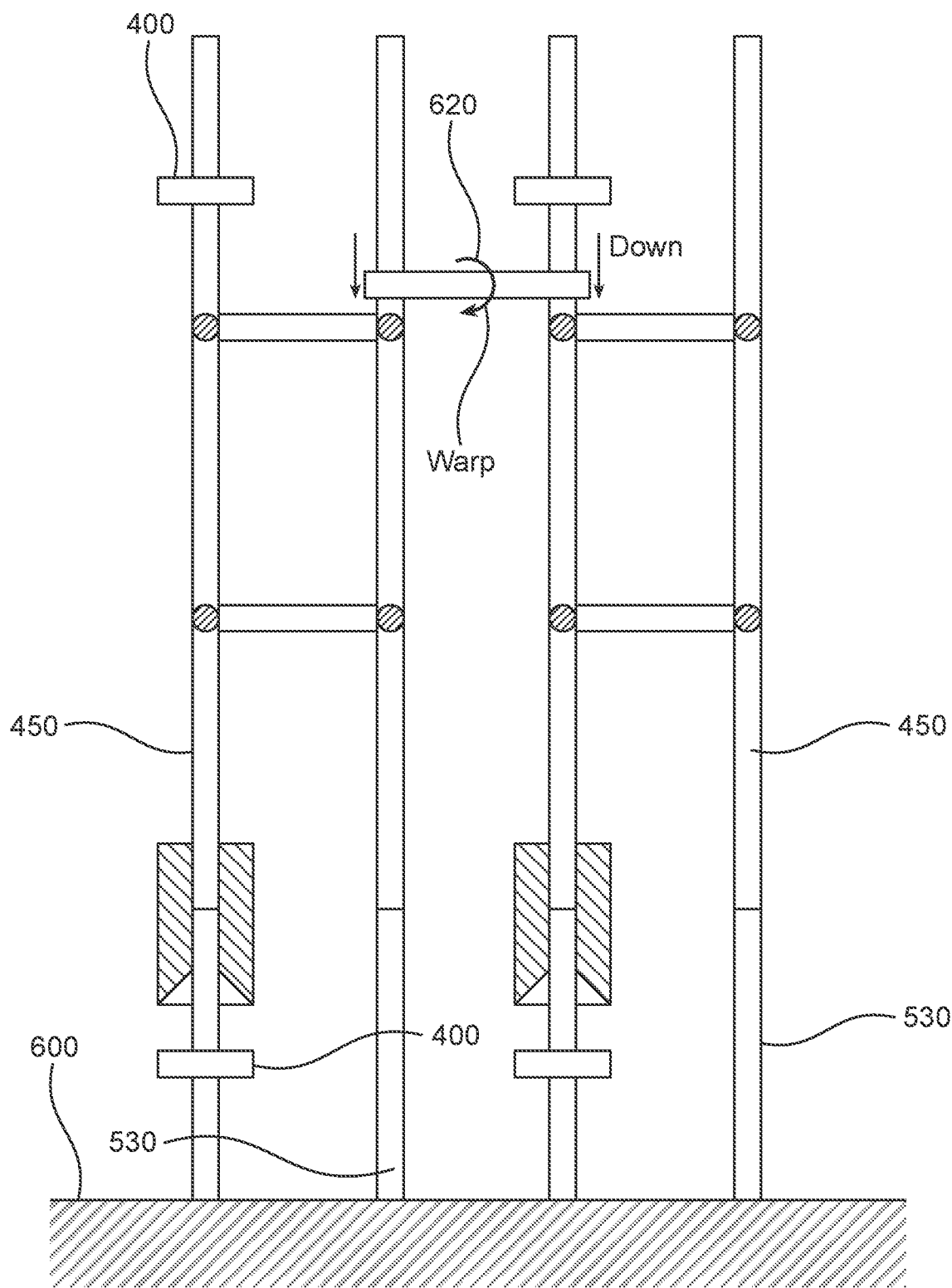
FIG. 12 is an illustration of the tying of the rebar to the adjacent rebar of the same layer.
Figure 13:
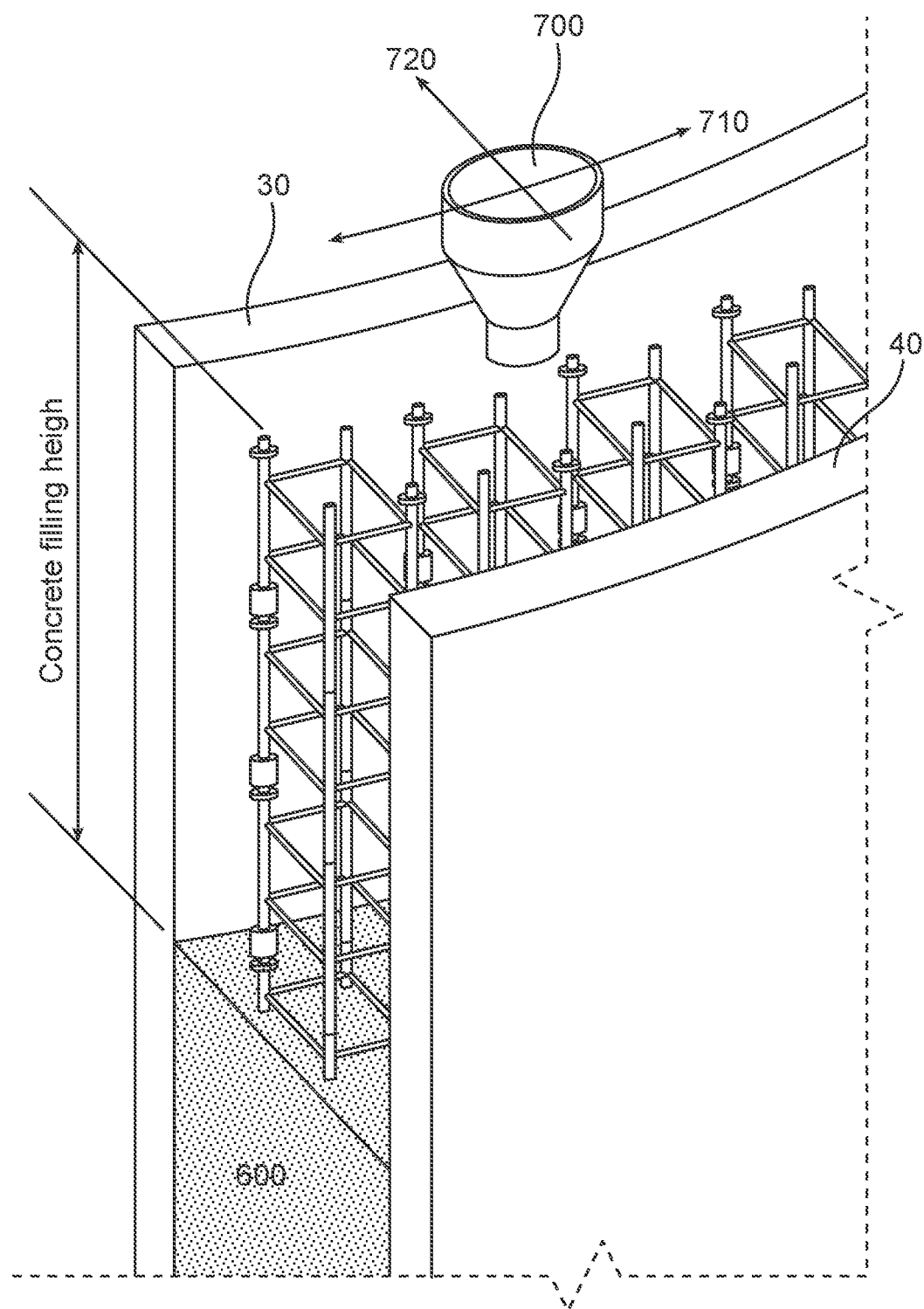
FIG. 13 illustrates the concrete casting step to reach the required casting level.

FIG. 12 is an illustration of the tying of the standard rebar module to the adjacent standard rebar module of the same layer. Two sets of rebar modules (380) are installed above two units of previous layer modules (530) that are cast in the concrete layer (600) (FIG. 13). A steel warping ring (620) is inserted downwards by the robotic arm to tie the adjacent modules.

After completion of the standard rebar reinforcement installation, the concrete is cast. The concrete can be delivered from the ground level using standard concrete delivering equipment. The robotic arm holds the dispensing nozzle. To ensure concrete filling and leveling of the cast concrete, the orbiting system can move back and forth in small steps while the robotic arm scans the orthogonal direction.

FIG. 13 illustrates the concrete casting step helping to reach the required casting level. The robotic arm holds the casting nozzle (700). The robotic arm passes the nozzle (700) above the outer shell rail (polymeric wall) (40) and dispenses the concrete in two scanning motions—along the rails—by the orbiting system (10), and across the rails (30 and 40)—by the robotic arm. To level the thin layer of concrete could be casted in each circling cycle. The casting process is completed while the cast concrete level reached the correct height where only the edges of the rebar modules are exposed—to allow insertion of the next rebar module level.

Several examples have been described. Nevertheless, it will be understood that various modifications may be made without departing from the disclosed method, device's spirit, scope, and method of use. Accordingly, other examples are within the scope of the following claims.

What is claimed is:

1. A printing system for printing the lower base of a wind tower, or the entire wind tower, comprising:
   a printing device configured to print first and second polymeric shells and wherein the polymeric shells are coaxial with an empty volume between them;
   a concrete material deposition device configured to deposit the concrete material into the empty volume between the first and second polymeric shells;
   a rebar handling device configured to deliver rebars into the volume between the first and second polymeric shells to reinforce the deposited concrete material;
   a rebar connection and tying device allowing to connect the different rebar elements into a unified construction; and
   a wheel system constructed of an outer plate and the inner plate disposed in spaced relation, carried on rails associated with one of the polymeric shells by two lines of motorized high friction wheels configured to ensure that a line of side wheels disposed on each of the outer and inner plates are engaged with respective side surfaces of the wind tower.

2. The printing system of claim 1, wherein an upper end of the lower base of a wind tower includes at least one cross-section consisting of a monolithic ring cross-section or a structured ring cross-sections.

3. The printing system of claim 1, wherein the printing device comprises an orbiting carriage traveling on a face of the polymeric shells in a reciprocating motion of slightly more than 360 degrees for each side.

4. The printing system of claim 1, wherein the printing device comprises an orbiting carriage traveling on a side face of the polymeric shells, and lifting itself from a ground level height to a top of the required wind tower base without the need of an additional lifting or driving unit.

5. The printing system of claim 1, wherein the printing device comprises an orbiting carriage traveling on the polymeric shells, the carriage carries a hose configured to deposit concrete material into the empty volume between the first and second polymeric shells.

6. The printing device of claim 5, wherein an X,Y,Z gantry is installed at the orbiting carriage back side.

7. The printing device of claim 5, wherein the X,Y,Z gantry includes a dispenser for dispensing thermoplastic or thermoset resins for printing the first and the second shells.

8. The printing system of claim 1, wherein at least the printing device moves along a printed polymeric shell circular end face, and wherein the printing device adopts its movement to the shell structure.

9. The printing system of claim 1, wherein the printing device includes wheels facilitating the printing device movement on a foundation base plate.

10. The printing system of claim 1, wherein a central plug and a rotating arm act as a compass and facilitate printing accurate shell circles on a foundation base plate.

11. The printing system of claim 1, wherein an optical target and an optical illuminator facilitate measurement of the height above a foundation base plate and the deviation from the center of its location.

12. The printing system of claim 1, wherein the rebar handling device is configured to handle standard construction rebar with at least two sleeves and at least two pressing disks on its edges.

13. The printing system of claim 12, wherein the rebar handling device is an electromagnetic device that is configured to pick up the rebar from a stationary rebar stack.

14. The printing system of claim 12, wherein the rebar handling device is configured to lift a unified construction rebar upwards using a controlled winch.

15. The printing system of claim 1, wherein an open platform stores a plurality of standard rebars.

16. The printing system of claim 1, further including a robotic arm configured to pick the unified construction defining a rebar module and insert it above a previous assembled rebar module.

17. The printing system of claim 16, wherein the robotic arm includes a press gripper, the gripper configured to insert the rebar module to the previously delivered rebar module using pressure seat by the sleeves.

18. The printing system of claim 17, wherein the gripper is configured to generate contra reaction by a pressing disk located on a previously installed rebar module.

19. The printing system of claim 1, further including a robotic arm with a gripper, the gripper configured to insert a warping ring and warp it around both newly inserted and the adjacent construction rebar modules, thus performing tying between the neighbor rebar modules.

20. The printing system of claim 1, further including a robotic arm holding a concrete material dispenser, the arm is configured to support movement in radial direction simultaneously with the device motion in circular direction to allow a thin layer of concrete casting.

21. The printing device of claim 20, wherein material dispenser is configured to deposit the thin layer of concrete casting in a repeated manner until a required casting height is achieved.

22. The wheel system of claim 1, further comprising a drive screw coupled between the outer plate and inner plate and a motor for driving the drive screw, the drive screw being configured to ensure that each of the lines of the side wheels are engaged with the wind tower side surfaces.

\* \* \* \* \*